Dec. 16, 1930.  R. R. DAILEY  1,785,249
ROCK CONVEYER
Original Filed March 23, 1929  3 Sheets-Sheet 1

INVENTOR
Roy. R. Dailey
BY Fred E. Mefford
ATTORNEY

Dec. 16, 1930.   R. R. DAILEY   1,785,249
ROCK CONVEYER
Original Filed March 23, 1929   3 Sheets-Sheet 3

INVENTOR
Roy R. Dailey
BY
Fred E. Mefford
ATTORNEY

Patented Dec. 16, 1930

1,785,249

UNITED STATES PATENT OFFICE

ROY R. DAILEY, OF COLORADO SPRINGS, COLORADO

ROCK CONVEYER

Original application filed March 23, 1929, Serial No. 349,417. Divided and this application filed January 27, 1930. Serial No. 423,851.

My invention relates to rock stackers. The subject matter of this application is disclosed in my application Serial No. 349,417 wherein I show my stacker working with my gold separator, for the purpose of stacking rocks delivered from the screening device of said separator.

The object of the present invention is to provide a stacker which can be swung in the arc of a circle while the conveyer is running. Other objects will appear as the description progresses.

Figure 1:
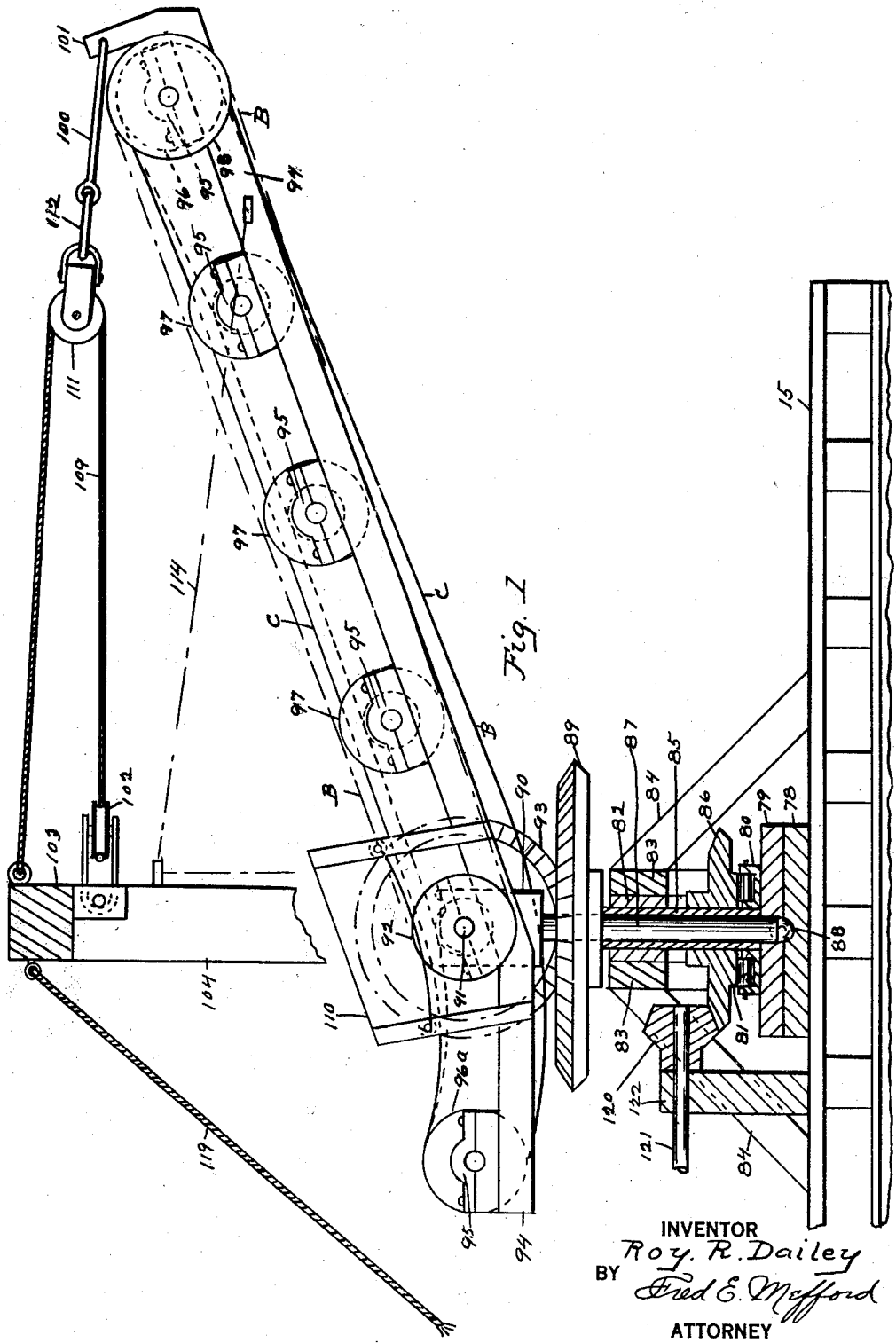
Figure 2:
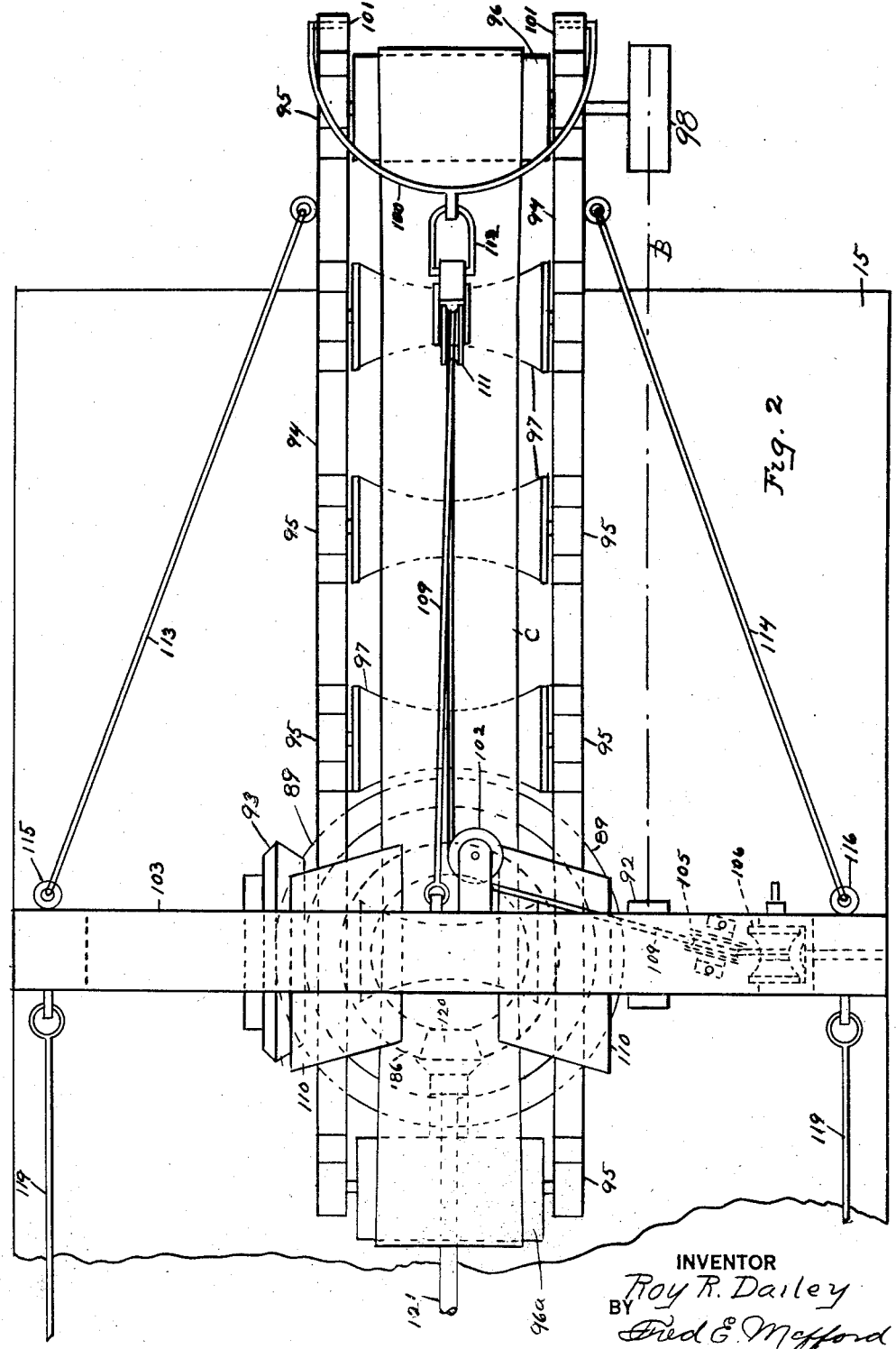
Figure 3:
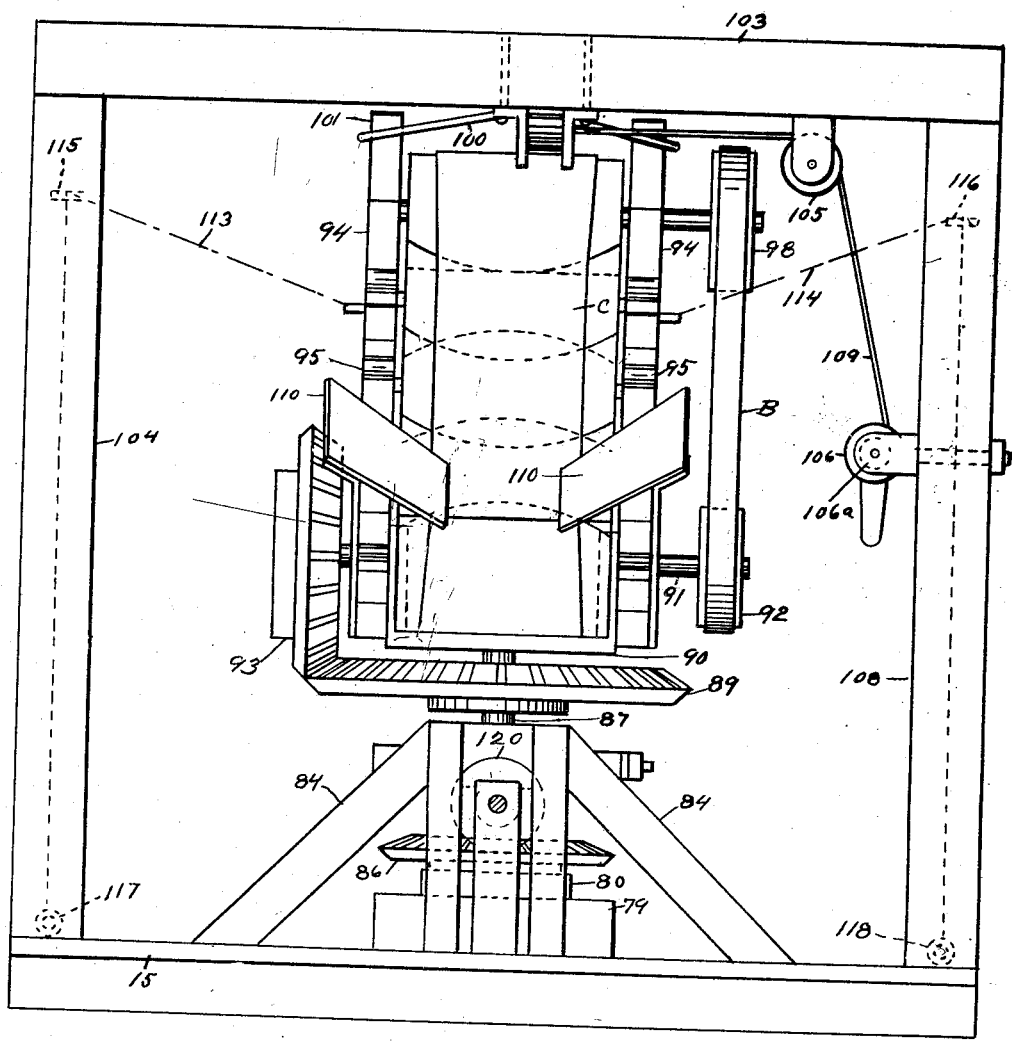

Figure 1 represents a side elevation of the stacker, partly in section; Fig. 2, a plan view of Fig. 1, and Fig. 3, an end elevation.

Although I have shown the preferred embodiment of my invention, I do not thereby limit myself to the form shown, but wish it understood that within the scope of what hereinafter is claimed, various changes in the precise details of construction may be made, without departing from the invention.

The stacker comprises the actuating means, the conveyer members, and the swinging and lifting means. The actuating means comprise a plate 78 containing a central depression; a plate 79 containing a bearing and disposed on plate 78; a roller bearing race 80 disposed on plate 79; a roller bearing 81 disposed on race 80; a bearing 82 mounted between blocks 83 supported by a truss 84; a hollow shaft 85 journalled in bearing 82; a secondary bevel gear 86 keyed on shaft 85 and disposed on roller bearing 81; a solid shaft 87 journalled in hollow shaft 85 and resting on a ball 88; a main bevel gear 89 keyed on hollow shaft 85; a bracket 90 mounted on solid shaft 87; a shaft 91 journalled in bracket 90; a pulley 92 mounted on one end of shaft 91 and a bevel gear 93 mounted on the opposite end and meshed with bevel gear 89. The conveyer members comprise a pair of side bars 94 provided with bearings 95; a cylindrical roller 96 having axles journalled in the bearings 95 in the free ends of said side bars; a cylindrical roller 96a having axles journalled in bearings 95 in the opposite end of said pair of side bars; concave rollers 97 having axles journalled in the intermediate bearings 95; a belt conveyer C mounted on said cylindrical and concave rollers; and a pulley 98 mounted on the axle of roller 96 and connected to pulley 92 by a belt B.

The lifting means comprise a bail 100 hooked to bearings 101 in side bars 94; a sheave 102 connected to a cross beam 103 supported by posts 104 and 108; a sheave 105 connected to cross beam 103; a winding drum 106 journalled in bearings 106a mounted on post 108. A sheave 111 connected to bail 100 by link 112; and a cable 109 connected to cross beam 103 and run over sheaves 111, 102—105 to winding drum 106. A hopper 110 is mounted on side bars 94 to guide the rocks into conveyer.

The swinging means comprise cables 113—114, attached to side bars 94 and run through rings 115—116 to floor rings 117—118, respectively.

To swing the conveyer clockwise, cable 113 is loosened and cable 114 pulled until the desired radical position is obtained, after which both cables are made fast to their respective floor rings.

The conveyer is elevated by operating winding drum 106 and thereby winding cable 109 thereon.

Although this slacker may be used for stacking other material than rocks, it was primarily designed for use with my gold separator described in said application Ser. No. 349,417. For this reason I show it mounted on a fragment of a platform 15 which represents the platform 15 shown in said application. The lower ends of the guy cables 119 are secured to platform 15.

The actuating mechanism is driven by a pinion 129 meshed with gear 89 and mounted on a shaft 121 which is journalled in a standard 122.

The material to be stacked falls into the hopper 110 and is carried by the conveyer over the roller 96 from which it falls by force of gravity. The concave rollers 97 permit the belt conveyer to sag and form a trough to keep the stones from rolling over the edges.

I claim:

1. A stacker of the class described comprising a pair of main bearings mounted in vertical alignment; a vertically disposed hollow shaft journalled in said main bearings; a horizontally disposed secondary bevel gear keyed on said vertically disposed hollow shaft, between said vertically aligned bearings; a horizontally disposed drive shaft provided with bearings and carrying a bevel pinion meshed with said secondary bevel gear; a horizontally disposed main bevel gear keyed on said hollow shaft, above said main bearings; a vertically disposed solid shaft mounted in said hollow shaft and carrying a bracket; a horizontally disposed conveyer actuating shaft journalled in said bracket, and carrying a bevel gear mounted on one end and meshed with said main bevel gear.

2. A stacker of the class described comprising a pair of main bearings mounted in vertical alignment; a vertically disposed hollow shaft journalled in said main bearings; a horizontally disposed secondary bevel gear keyed on said vertically disposed hollow shaft, between said vertically aligned bearings; a horizontally disposed drive shaft provided with bearings and carrying a bevel pinion meshed with said secondary bevel gear; a horizontally disposed main bevel gear keyed on said hollow shaft, above said main bearings; a vertically disposed solid shaft mounted in said hollow shaft and carrying a bracket; a horizontally disposed conveyer actuating shaft journalled in said bracket, and carrying a bevel gear mounted on one end and meshed with said main bevel gear; a pair of conveyer side bars mounted on said conveyer actuating shaft; a shaft, carrying a pulley and a cylindrical roller, journalled on one end portion of each side bar; a shaft, carrying a cylindrical roller, journalled on the other end portion of each side bar; a pulley mounted on said last named shaft; a belt mounted on said pulleys.

3. A stacker of the class described comprising a pair of main bearings mounted in vertical alignment; a vertically disposed hollow shaft journalled in said main bearings; a horizontally disposed secondary bevel gear keyed on said vertically disposed hollow shaft, between said vertically aligned bearings; a horizontally disposed drive shaft provided with bearings and carrying a bevel pinion meshed with said secondary bevel gear; a horizontally disposed main bevel gear keyed on said hollow shaft, above said main bearings; a vertically disposed solid shaft mounted in said hollow shaft and carrying a bracket; a horizontally disposed conveyer actuating shaft journalled in said bracket, and carrying a bevel gear mounted on one end and meshed with said main bevel gear; a pair of conveyer side bars mounted on said conveyer actuating shaft; a shaft, carrying a pulley and a cylindrical roller, journalled on one end portion of each side bar; a shaft, carrying a cylindrical roller, journalled on the other end portion of each side bar; a pulley mounted on said last named shaft; a belt mounted on said pulleys; intermediate rollers spaced from each other and journalled on said side bars; a belt conveyer mounted on said rollers; for the purpose of stacking rock and other material.

4. A stacker of the class described comprising a pair of main bearings mounted in vertical alignment; a vertically disposed hollow shaft journalled in said main bearings; a horizontally disposed secondary bevel gear keyed on said vertically disposed hollow shaft; between said vertically aligned bearings; a horizontally disposed drive shaft provided with bearings and carrying a bevel pinion meshed with said secondary bevel gear; a horizontally disposed main bevel gear keyed on said hollow shaft above said main bearings; a vertically disposed solid shaft mounted in said hollow shaft and carrying a bracket mounted on its upper end; a horizontally disposed shaft journalled in said bracket; a bevel gear mounted on one end of said horizontal shaft and meshed with said main bevel gear, and a pulley mounted on the opposite end; a pair of conveyer side bars mounted on said horizontally disposed shaft; a shaft, carrying a pulley and a cylindrical roller, journalled in one end of said pair of side bars, and a shaft, carrying a cylindrical roller, and a pulley journalled in the opposite end; a belt mounted on said pulleys; concave rollers mounted on said side bars between said cylindrical rollers; and a belt conveyer mounted on said cylindrical and convex rollers; for the purpose of stacking rock and other material in placer mining.

ROY R. DAILEY.